(12) United States Patent
Mills et al.

(10) Patent No.: US 8,006,674 B2
(45) Date of Patent: Aug. 30, 2011

(54) VAPOR CONTROL SYSTEM

(75) Inventors: Vaughn K. Mills, Chelsea, MI (US); Kenneth M. Spink, Horton, MI (US)

(73) Assignee: Eaton Corporation, Cleveland, OH (US)

( * ) Notice: Subject to any disclaimer, the term of this patent is extended or adjusted under 35 U.S.C. 154(b) by 342 days.

(21) Appl. No.: 11/495,799

(22) Filed: Jul. 28, 2006

(65) Prior Publication Data

US 2007/0023016 A1 Feb. 1, 2007

Related U.S. Application Data

(60) Provisional application No. 60/703,184, filed on Jul. 28, 2005.

(51) Int. Cl.
*F02M 33/02* (2006.01)

(52) U.S. Cl. ........................................ 123/520

(58) Field of Classification Search .......... 123/516, 123/518, 519, 520; 137/247.17, 588
See application file for complete search history.

(56) References Cited

U.S. PATENT DOCUMENTS

| 6,354,280 | B1 * | 3/2002 | Itakura et al. ............. 123/519 |
| 6,874,484 | B2 * | 4/2005 | Benjey ..................... 123/520 |
| 6,951,209 | B2 * | 10/2005 | Yanase et al. .............. 123/516 |
| 7,325,577 | B2 * | 2/2008 | Devall ..................... 141/59 |

* cited by examiner

*Primary Examiner* — Hieu T Vo
*Assistant Examiner* — Arnold Castro
(74) *Attorney, Agent, or Firm* — Anna M. Shih; Kevin M. Hinman

(57) ABSTRACT

A valve is disposed between a fuel tank and an engine intake manifold in a small engine fuel system equipped to recapture running loss evaporative emissions. The valve includes a resilient diaphragm that blocks the flow path When vapor pressure in the fuel tank reaches a predetermined level, the diaphragm opens and allows the vacuum forces in the manifold to purge the vapors in the fuel tank by drawing the vapors into the manifold to be burned in the engine. The diaphragm isolates the fuel tank vapor dome from the vacuum pressure generated in the manifold, thereby preventing the engine from being starved of fuel. The valve may be integrated with a liquid discriminating valve to form a valve assembly.

21 Claims, 4 Drawing Sheets

VAPOR CONTROL SYSTEM

RELATED APPLICATIONS

This application claims the benefit of U.S. Provisional Application No. 60/703,184, filed Jul. 28, 2005 entitled "Vapor Control System For Small Engines", which is incorporated herein by reference in its entirety.

TECHNICAL FIELD

The present invention relates to vapor control systems and more particularly to a fuel vapor control system for applications requiring vapor control, such as small engine applications.

BACKGROUND OF THE INVENTION

Recent pending regulations for controlling the emission of fuel vapors have required installation of fuel vapor emission control devices to limit escape of fuel vapors through the engine air inlet during periods when the engine is not operating and provide a purging mechanism that operates when the engine is running. This recently imposed requirement on small engine manufacturers has created problems in installing the engines in the equipment in which they are to be used inasmuch as the equipment manufacturer commonly purchases the engine and fuel tank for installation as a subassembly during final assembly of the engine operated equipment. Thus, the burden of providing fuel vapor emission control for these applications has been imposed upon the small engine manufacturer and has created problems in the design and installation of the tank and fuel system for the small engines.

Recapturing running loss evaporative emissions is one way to meet these pending regulations. During purging, vacuum forces pull vapor in the fuel tank into the manifold so that the vapors can be burned in the engine. However, the vacuum forces may be so great that it creates a high vacuum pressure state in the fuel tank, starving the engine of fuel.

There is a desire for a vapor control system that can recapture running loss evaporative emissions without causing the engine to stall because of insufficient fuel.

SUMMARY OF THE INVENTION

The present invention is directed to a valve for use in a small engine fuel system equipped to recapture running loss evaporative emissions. The valve structure allows purging of fuel vapors in a fuel tank via vacuum forces in an engine intake manifold. In one embodiment, the valve is disposed in a vapor flow path connecting the small engine fuel tank and the engine intake manifold. The valve includes a resilient diaphragm that blocks the flow path. When vapor pressure in the fuel tank reaches a predetermined level, the diaphragm opens and allows the vacuum forces in the manifold to purge the vapors in the fuel tank by drawing the vapors into the manifold. These vapors are then burned in the engine. The diaphragm prevents the engine from being fuel-starved by isolating the fuel tank vapor dome from the vacuum pressure generated in the manifold. The valve may include a check valve to allow fresh air to enter the fuel tank as fuel is consumed.

DETAILED DESCRIPTION OF THE EMBODIMENTS

FIGS. 1 through 4 are representative diagrams of a vapor system, such as a small engine fuel system 10, incorporating a valve 12 according to one embodiment the present invention. The system 10 is designed to recapture running loss evaporative emissions to meet more stringent emission requirements for small engine devices, such as lawn mowers and portable generators.

Figure 1:
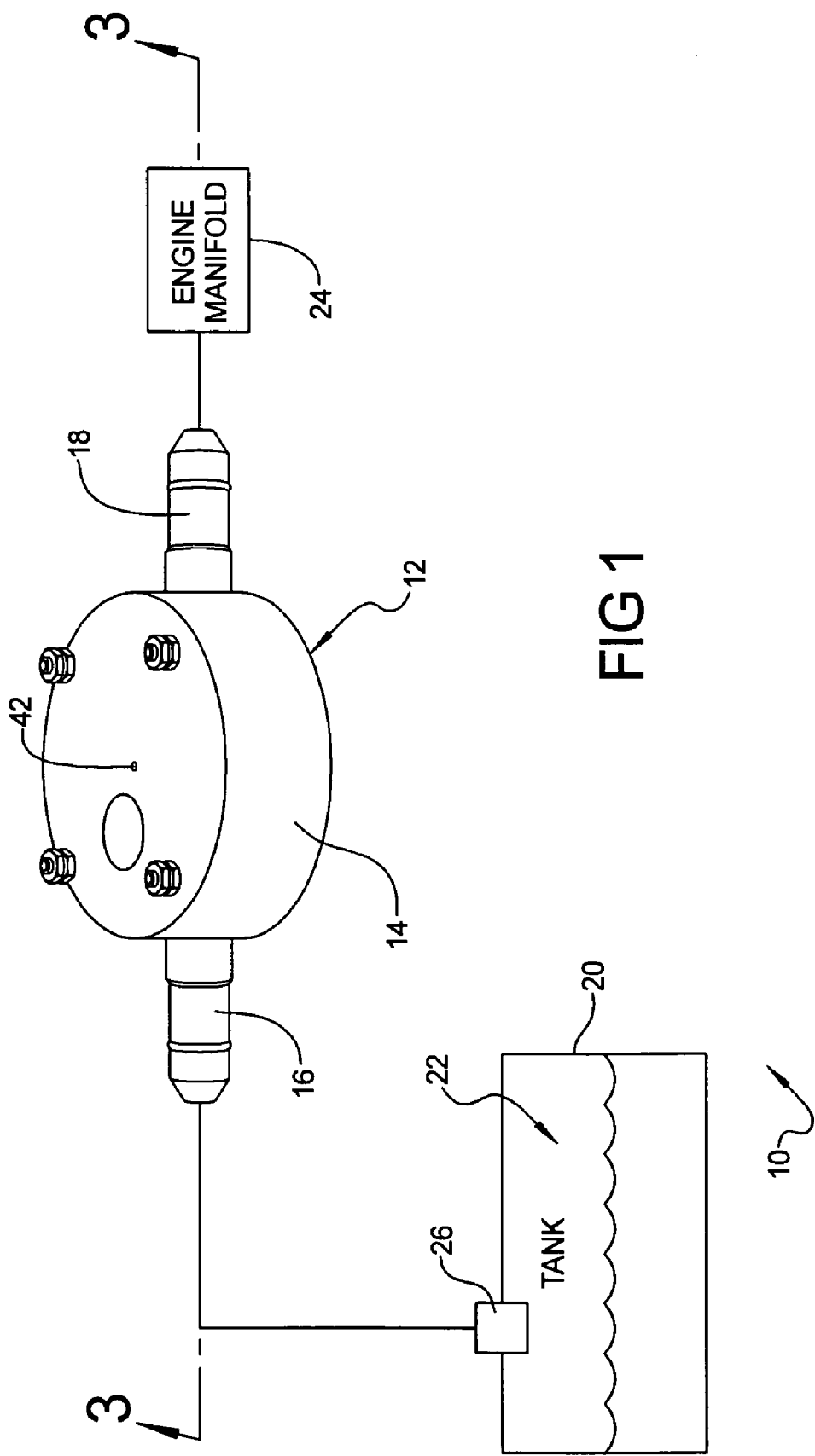
FIG. 1 is a representative view of a fuel system incorporating the invention.
Figure 2:
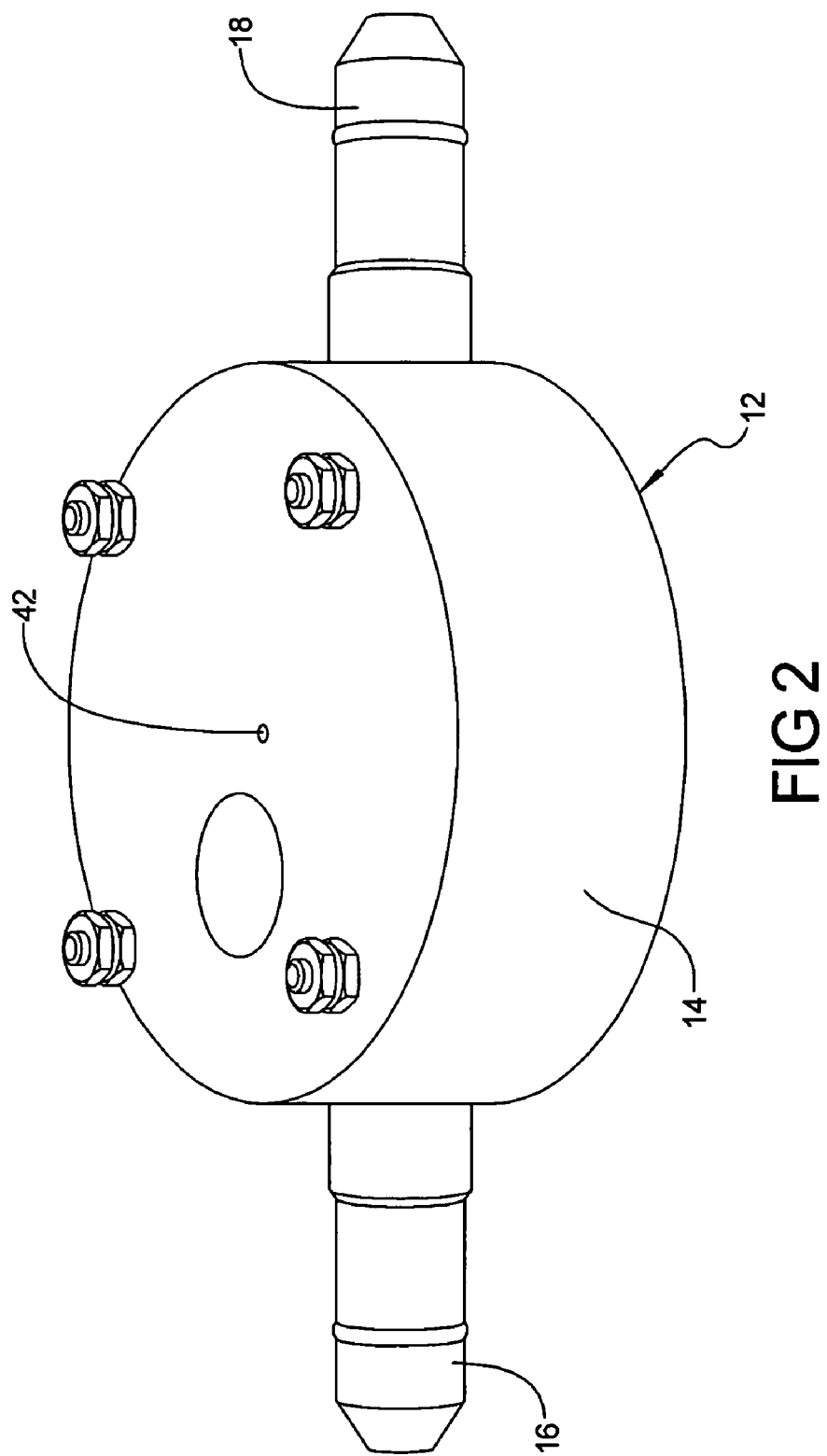
FIG. 2 is a perspective view of one embodiment of the invention.

Referring to FIGS. 1 and 2, the valve 12 includes a housing 14, an optional fuel tank port 16 and an engine manifold port 18. As will be described in greater detail below, the ports 16, 18 may be eliminated without departing from the scope of the invention.

The valve 12 is attachable to a fuel tank 20 so that the fuel tank port 16 communicates with a vapor dome 22 in the tank 20. The manifold port 18 communicates with an engine manifold 24 so that vapor can flow through the manifold port 18 to send fuel vapor to the engine 24. In one embodiment, the tank port 16 is attached to a liquid/vapor discriminator 26 with overfill protection that prevents liquid fuel from entering the valve 12.

Figure 3:
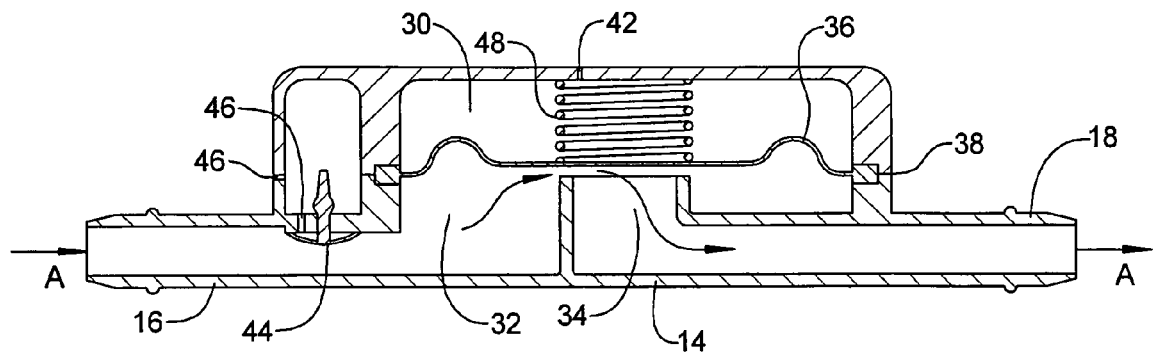
FIG. 3 is a representative section view of one embodiment of the invention in a first operating position.

FIG. 3 is a section view of the valve 12 taken along line 3-3 in FIG. 1. The tank port 16 and the manifold port 18 open up into a cavity 30 via a tank passage 32 and a manifold passage 34, respectively, within the housing 14. In the illustrated embodiment, the passages 32, 34 are coupled with the tank port 16 and the manifold port 18, respectively, to connect with the fuel tank 20 and the engine manifold 24. However, the passages 32, 34 may also be openings in the valve housing 14 that communicate directly with the fuel tank 20 and/or the manifold 14 without any port in between. For example, the valve 12 may be placed inside a fuel tank and attached so that vapor can flow from the tank 20 directly to the fuel tank passage 32.

A diaphragm 36 disposed within the cavity 30 over the passages 32, 34 open and close the passages 32, 34 to selectively create a vapor flow path. In one embodiment, the diaphragm 36 has a bead 38 that engages with a groove 40 in the cavity 30 to form a leak-free seal holding the diaphragm 36 in place. A vent opening 42 may be formed in the housing 14 to vent the cavity 30 to the atmosphere to prevent a pressure-locked condition, which would prevent the diaphragm 36 from actuating. The vent opening 42 may also act as an atmospheric pressure reference for the diaphragm 36 by keeping the pressure in the cavity 30 at atmospheric pressure.

In FIG. 3, the diaphragm 36 is in an open position, forming a flow path indicated by arrow A. The diaphragm 36 is arranged so that it will be normally closed when vacuum forces in the manifold port 34 pull vapor from the tank port 32 through the passages 32, 34 and the cavity 30 along the flow path A so that the vapor can be burned in the small engine. The diaphragm 36 actuates to the open position shown in FIG. 3 when the pressure in the fuel tank vapor dome 22 reaches a predetermined level (e.g., greater than atmospheric pressure), allowing vapor to flow from the tank port passage 32 to the manifold port passage 34. At this point, excess vapors from the fuel tank 20 are purged by the engine manifold 24 until the system 10 reaches equilibrium, causing the diaphragm 36 to reseat back to its normally closed position. In one embodiment, the system 10 reaches equilibrium when the pressure underneath the diaphragm 36 is at atmospheric pressure.

In one embodiment, the valve 12 also includes a normally-closed check valve 44 and at least one orifice 46 that allows make-up air into the fuel tank 20. In the illustrated embodiment, the check valve 44 is an umbrella seal valve, but any other valve may be used as the check valve 44 without departing from the scope of the invention. The valve 12 may also include an optional resilient member 48, such as a coil spring, that biases the diaphragm 36 to a closed position and creates a head valve function to protect the fuel tank 20 from an overfill condition during refueling. The resilient member 48 holds the diaphragm 36 in a closed position during refueling until the fuel tank pressure, and therefore the pressure in the tank port 16, reaches a predetermined level high enough (e.g., higher than atmospheric pressure) to overcome the biasing force of the resilient member 48 and push the diaphragm 36 open. Note, however, that the resilient member 48 may be eliminated from the valve 12 without departing from the scope of the invention.

Figure 4:
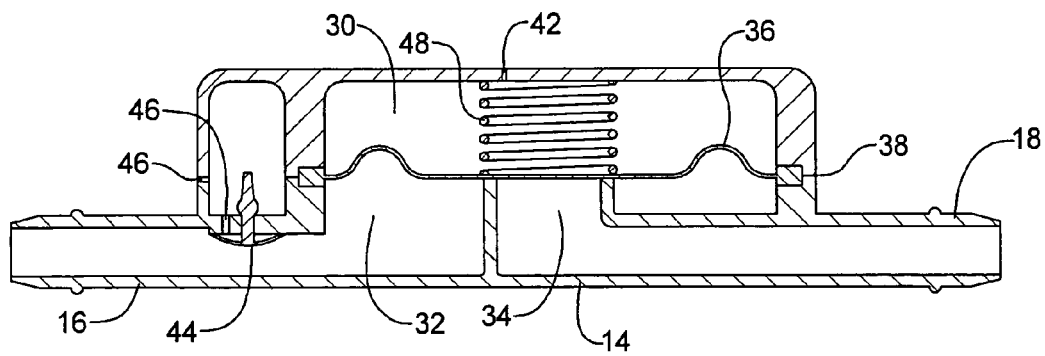
FIG. 4 is a representative section view of the embodiment shown in FIG. 3 in a second operating position.

FIG. 4 shows the valve 12 when the diaphragm 36 is in its normally closed position. This occurs when the vacuum pressure in the manifold port 18 is high enough to pull the diaphragm 36 shut and seal off the passages 32, 34. As a result, the valve 12 isolates the vacuum pressure in the manifold port 18 and prevents the vacuum pressure in the engine manifold 24 from creating a vacuum pressure in the vapor dome 22 that in turn stops the flow of fuel to the engine carburetor (not shown) via a gravity feed or fuel pump (not shown). As fuel is consumed by the engine (not shown), the check valve 44 opens to allow fresh atmospheric make-up air from the make-up air orifices 46 to relieve potential vacuum pressure in the vapor dome 22, increasing the vapor pressure in the tank 20. Once the vacuum pressure in the fuel tank 20 has been dissipated, the check valve 44 returns to its closed position.

Figure 5:
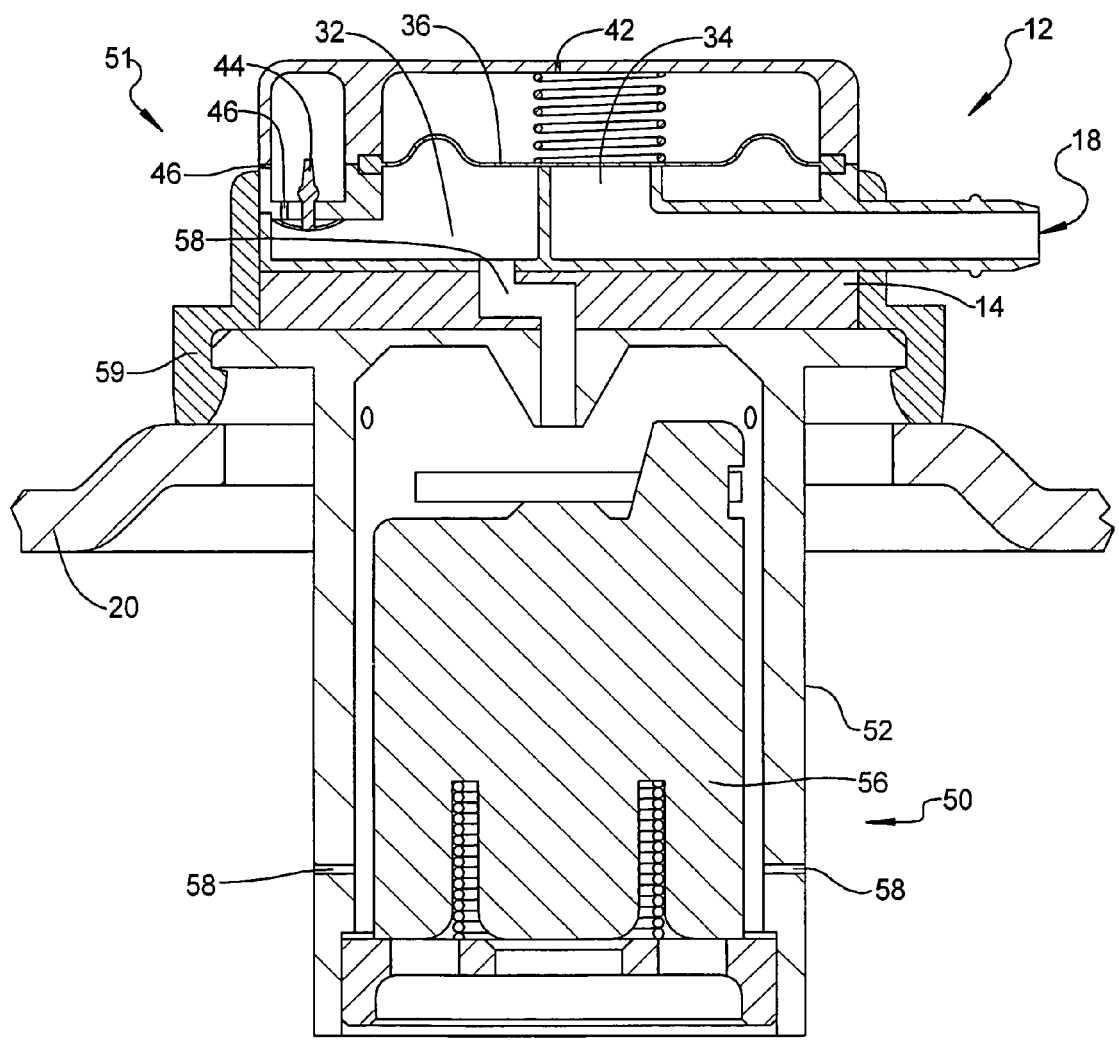
FIG. 5 is a representative section view of another embodiment of the invention.

FIG. 5 is a representative section view of a valve assembly according to one embodiment of the invention. In this embodiment, the inventive valve 12 described above is integrated with the liquid discriminator (LD) valve 26 to form a valve assembly 51. The LD valve 26 can be any type of valve that can discriminate between liquid fuel and fuel vapor. Possible LD valves that could be incorporated into the valve assembly 51 include, but are not limited to, rollover valves, variable orifice valves, grade vent valves, or grade vent valves with reverse flow capability. The LD valve portion 50 of the valve assembly 51 has an LD passage 54 that is opened and closed by an LD float 56. A portion of the liquid discriminating valve 50 portion of the assembly 51 is disposed in the fuel tank 20 when the fuel system is assembled.

As shown in the figure, fuel vapor enters the inventive valve 12 portion of the assembly 51 through the liquid discriminating valve portion 50 rather than through a tank port. More particularly, the housing 14 of the valve 12 includes an opening 58 that fluidically couples the tank port passage 32 of the valve 12 with the LD passage 54 of the LD valve 50. When the LD passage 54 is open, fuel vapor in the fuel tank 20 flows through holes 58 formed in the LD housing 52 and up through the LD passage 54 into the tank port passage 32. The combined valve 12 and liquid discriminating valve 50 portions may share a common housing 59 so that the entire assembly 51 can be connected to the tank 20 as a single unit in a single manufacturing step. The assembly 51 may be connected to the tank 20 via any appropriate method, such as welding, a grommet, interference fit, etc. By integrating the valve 12 with the liquid discriminating valve 50 into a single unit, this embodiment eliminates the need for a separate tank port 16 to direct fuel vapor into the valve 12 and provides a simple way to assemble a small engine vapor management system.

The description above focuses on using the inventive valve in a small engine fuel system. However, the valve may be used in any application requiring vapor pressure control without departing from the scope of the invention.

Although the invention has hereinabove been described with respect to the illustrated embodiments, it will be understood that the invention is capable of modification and variation and is limited only by the following claims.

What is claimed is:

1. A engine fuel system, comprising:
a fuel tank having a vapor dome above a fuel level;
an engine manifold;
a valve disposed between the fuel tank and the engine manifold, the valve including
a fuel tank passage for communicating with the vapor dome in the fuel tank,
an engine manifold passage for communicating with an engine;
a first cavity coupled with the fuel tank passage and the engine manifold passage to form a vapor flow path between the fuel tank and the engine manifold, the cavity having an atmospheric pressure vent, the first cavity having a first orifice venting the first cavity to the atmosphere to keep the pressure in the cavity at atmospheric pressure;
a second cavity separate from the first cavity and tank passage, the second cavity having a second orifice directly vented to the atmosphere:
a check valve that selectively allows atmospheric make-up air from the second orifice to enter the tank through the tank passage: and
a pressure-responsive valve member disposed in the first cavity, the valve member using atmospheric pressure as a reference and being movable between an open position that allows vapor flow between the fuel tank passage and the engine manifold passage when pressure in the tank is above atmospheric pressure and a closed position that blocks vapor flow between the fuel tank passage and the engine manifold passage to isolate the vapor dome in the fuel tank from the engine manifold when pressure in the manifold passage is below atmospheric pressure, wherein the manifold passage provides a direct vapor flow path between the valve member and the manifold.

2. The system of claim 1, wherein the pressure-responsive valve member is normally closed until a pressure level in the fuel tank reaches a predetermined level.

3. The system of claim 1, wherein the pressure-responsive valve member is a diaphragm.

4. The system of claim 1, further comprising a resilient member that biases the pressure-responsive valve to the closed position during refueling.

5. The system of claim 4, wherein the resilient member is a coil spring.

6. The system of claim 1, further comprising a liquid/vapor discriminator disposed between the fuel tank and the fuel tank passage.

7. The system of claim 1, further comprising at least one of a fuel tank port disposed between the fuel tank and the fuel tank passage and an engine manifold port disposed between the engine manifold and the engine manifold passage.

8. The system of claim 1, further comprising a vent that vents the first cavity.

9. The system of claim 8, wherein the vent is an atmospheric vent pressure vent, and wherein the valve member uses atmospheric pressure as a reference pressure.

10. A valve for controlling vapor, comprising:
   a tank passage for communicating with a tank containing a vaporizable fluid;
   a manifold passage for communicating with a manifold;
   a first cavity coupled with the tank passage and the manifold passage to form a vapor flow path, the first cavity having a first orifice venting the first cavity to the atmosphere to keep the pressure in the first cavity at atmospheric pressure;
   a second cavity separate from the first cavity and tank passage, the second cavity having a second orifice directly vented to the atmosphere;
   a check valve that selectively allows atmospheric make-up air from the second orifice to enter the tank through the tank passage; and
   a pressure-responsive valve member disposed in the first cavity, the valve member being movable between an open position that allows vapor flow between the tank passage and the manifold passage when pressure in the tank is above atmospheric pressure and a closed position that blocks vapor flow between the tank passage and the manifold passage when pressure in the manifold passage is below atmospheric pressure, wherein the manifold passage provides a direct vapor flow path between the valve member and the manifold.

11. The valve of claim 10, wherein the tank is a fuel tank and the manifold is an engine manifold.

12. The valve of claim 10, wherein the pressure-responsive valve member is normally closed until a pressure level in the tank reaches a predetermined level.

13. The valve of claim 10, wherein the pressure-responsive valve member is a diaphragm.

14. The valve of claim 10, further comprising a resilient member that biases the pressure-responsive valve to the closed position during filling of the tank.

15. The valve of claim 14, wherein the resilient member is a coil spring.

16. The valve of claim 10, further comprising at least one of a first port disposed between the tank and the tank passage and a second port disposed between the manifold and the manifold passage.

17. The valve of claim 16, wherein the first port is a fuel tank port and the second port is an engine manifold port.

18. The valve of claim 10, further comprising a vent that vents the first cavity.

19. The valve of claim 18, wherein the vent is an atmospheric vent pressure vent, and wherein the valve member uses atmospheric pressure as a reference pressure.

20. The system of claim 10, wherein the check valve is an umbrella valve.

21. The valve of claim 10, wherein the second cavity includes a groove and the valve member includes a bead that is configured to engage with the groove in the second cavity to form a seal.

* * * * *